United States Patent [19]

Crabtree et al.

[11] Patent Number: 4,504,157
[45] Date of Patent: Mar. 12, 1985

[54] CHILL TEMPERATURE METER

[76] Inventors: Austin Crabtree, Rte. 4, Box 265;
James R. Crabtree, Rte. 4, Box 264;
Jeffrey Crabtree, Rte. 4, Box 265, all of Rockwood, Tenn. 37854

[21] Appl. No.: 431,158

[22] Filed: Sep. 30, 1982

[51] Int. Cl.³ .............................................. G01K 3/00
[52] U.S. Cl. .................................... 374/109; 73/170 R
[58] Field of Search ....................... 374/109; 73/170 R

[56]  References Cited
U.S. PATENT DOCUMENTS

| | | | |
|---|---|---|---|
| 3,181,364 | 5/1965 | Barton | 374/109 |
| 3,954,007 | 5/1976 | Harrigan | 374/109 |
| 4,073,190 | 2/1978 | MacHattie et al. | 374/109 |
| 4,125,012 | 11/1978 | Madsen | 374/109 |
| 4,287,762 | 9/1981 | Baer | 73/170 R |

FOREIGN PATENT DOCUMENTS

WO81/02638  9/1981  PCT Int'l Appl. .

OTHER PUBLICATIONS

"Still shade temperature meter for use in essessing personal cold stress", MacHattie et al., Jul. 1980, National Semiconductor, Temperature controller.

Primary Examiner—Charles Frankfort
Assistant Examiner—David R. Schuster
Attorney, Agent, or Firm—Pitts and Brittian

[57]  ABSTRACT

A meter for determining chill temperature and/or chill effect as a measure of comfort of an individual. This meter utilizes a sensor that is responsive to ambient temperature, wind velocity, humidity and/or solar effects. The sensor simulates a human body with normal covering for the prevailing real temperature, and electrical circuits are responsive to changes in effective temperatures due to these environmental factors. In one embodiment, the inner surface of the sensor is maintained at a selected constant temperature. The temperature associated therewith provides an error signal if a temperature differences is noted, this error signal causing current to flow to heat dissipaters to restore the select constant temperature. The amount of power required to maintain the selected temperature is a measure of the effect of the environmental factors and therefore relatable to chill temperature and/or chill effect. In another embodiment, a constant current is directed to a heater element within the sensor and a temperature sensor monitors the ambient temperature. The chill temperature signal is obtained from a change in the differential temperature between the sensor and the ambient. All embodiments provide for a visual display of a chill temperature value.

15 Claims, 6 Drawing Figures

CHILL TEMPERATURE METER

DESCRIPTION

1. Technical Field

This invention relates generally to a device to measure the comfort (or discomfort) of a person in the environment during winter or summer, and more particularly to a meter for determining the chill temperature, or chill factor, to be experienced by such person. The meter takes into account real temperature, wind velocity, moisture content and solar effects.

2. Background Art

It has been well recognized that human comfort is affected by several variables within the local environment. For example, the feeling of hot or cold is not only related to the ambient temperature but is also related to wind velocity, humidity, etc. For example, in winter with an ambient real temperature (as measured with a thermometer) of 32° F., a person may feel that the temperature is 20° F. if there is a significant wind. The relative humidity, as well as solar radiation, also significantly affects the comfort of the individual. It is for these reasons, particularly the relationship of temperature and wind velocity, that "chill factor" curves have been derived. Accordingly one may measure the real temperature and the wind velocity of an environment and, through use of the curves, predict the chill factor or how the person will probably feel in that environment. However, as stated above, other factors influence the comfort of a person and these factors are not dealt with by the curves to a reasonable degree of accuracy. Furthermore, although the same factors affect the comfort of an individual at elevated temperatures, no effort has been made to extend the prediction of a person's comfort (summer chill factor) under the various conditions of the summer environment.

Numerous devices have been designed to measure the chill factor and display it in some fashion directly rather than the use of curves for an interpretation of chill factor. One such device is described in U.S. Pat. No. 3,753,371 issued to R. W. Anderson on Aug. 21, 1973. In that device a wind cup assembly drives a drum having a scale of the wind chill values. The force created by the wind is opposed by a spring which restrains the drum, and the thermometer has an indicator for interaction of the scales. Accordingly, the wind chill factor may be read directly from the device.

Another such device is described in U.S. Pat. No. 4,091,667 issued to G. K. Anderson on May 30, 1978. The device described therein is a hand-held measuring instrument for indicating air temperature and individually indicating wind velocity. The device carries chill factor curves affixed thereto for a visual read out of the chill factor from the curves using the wind velocity value and the temperature value.

In the device described in U.S. Pat. No. 3,954,007 issued to R. M. Harrigan on May 4, 1976, separate detectors are utilized for determining the temperature and the wind velocity. Electrical outputs from these two sensors are then treated in appropriate electronic circuits which are programmed to give a direct read out of the wind chill factor. In this device the use of read out curves is eliminated so that there is no need for interpretation of such curves in the determination of the chill factor.

U.S. Pat. No. 4,287,762 issued to J. S. Baer on Sept. 8, 1981, describes a totally digitalized weather station. It provides a digital display with selection elements for selecting a particular transducer and indicating the value of the variable measured by that indicator. The value of wind speed and temperature are utilized to compute a wind chill factor to be displayed upon the face of the device, the value being displayed digitally.

A more complex meter is described in U.S. Pat. No. 4,073,190 issued to L. E. MacHattie on Feb. 14, 1978. In that device means are provided for generating five (5) signals: the first is proportional to the temperature; the second is proportional to the non-evaporative rate of body heat loss; the third is a signal representative of thermal insulation resistance of still air outside the clothing of a wearer; the fourth signal is representative of the fraction of full sunlight intensity reaching a person wearing the clothing; and the fifth is representative of the absorbance of the clothing. The device includes circuitry for adding the first signal to the product of the second and third signals, and to apply certain numerical constants to these and other of the signals to produce an output signal which is related to the "still shade" temperature. This term is a designation of the effective temperature of a person to either solar radiation or to any wind velocity.

Although the device described by MacHattie takes into account more than just temperature and wind velocity, neither it nor the devices described in the other patents closely simulates the conditions existing at the skin surface of an individual and therefore they do not provide an output that can be related to the true effective temperature as indicated by the comfort or discomfort of the person.

Accordingly, it is objective of the present invention to provide a meter which will provide an indication of the comfort of a person as reflected in a chill temperature during either summer or winter.

It is another object of the present invention to provide a detector which will simulate the composite conditions existing at the skin surface of a person and provide signals related to the comfort of that individual.

It is still another object of the present invention to provide a meter which, through proper calibration, can give accurate indications of the chill temperature and thus the comfort of a person in widely varying environments.

It is a further object to provide a chill meter having a constant temperature sensor connected to appropriate circuitry to maintain that temperature, and to measure the current (or power) required to maintain that temperature as a function of the chill temperature.

It is also an object to provide a chill temperature meter having a differential temperature sensor connected to circuitry for producing a read out of the chill temperature derived from the differential temperature.

Other objects of the present invention will become apparent upon a consideration of the description hereinafter as referenced to the drawings.

DISCLOSURE OF THE INVENTION

In accordance with the present invention, a meter is provided whereby an output signal is derived that is related to the comfort of an individual and more specifically to the correct chill temperature experienced by that individual. The meter includes a sensor which simulates the conditions at the skin surface of an individual whereby these conditions are utilized to compute the chill temperature. More specifically the sensor is cumulatively responsive to actual temperature, wind velocity, humidity and solar effects.

BEST MODE FOR CARRYING OUT THE INVENTION

Figure 1:
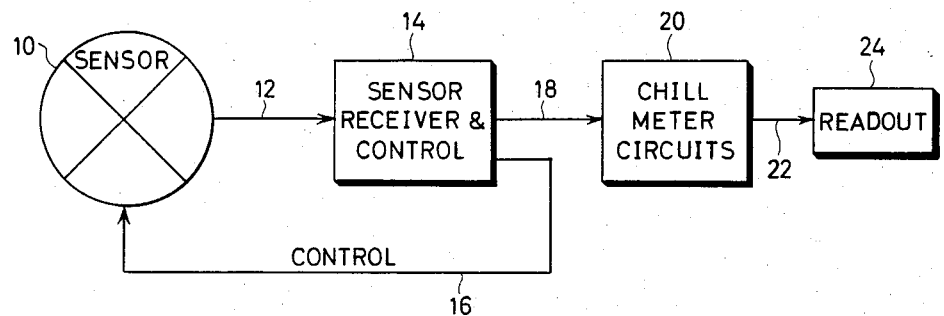
FIG. 1 is a general block diagram of the instrument of the present invention.

As discussed above, a meaningful chill temperature, which is related to the comfort of an individual, is affected by at least four (4) variables. These include actual temperature, wind velocity, humidity and solar effects. Referring now to FIG. 1, a schematic block diagram is shown for a meter which takes into account these variables and produces a read-out in the form of numbers corresponding to the chill temperature. A sensor 10 is provided which uniquely responds to combined effects of temperature, wind velocity, humidity and solar radiation in a manner similar to the skin of an individual. The output of this sensor passes through lead 12 to a sensor receiver and control system 14. As discussed in more detail hereinafter, a control signal is returned to the sensor 10 through the control lead 16. An ouput from the sensor receiver and control 14 passes through the lead 18 to chill meter circuits 20, and a resultant signal then passes through lead 22 to a read-out 24.

Figure 2:
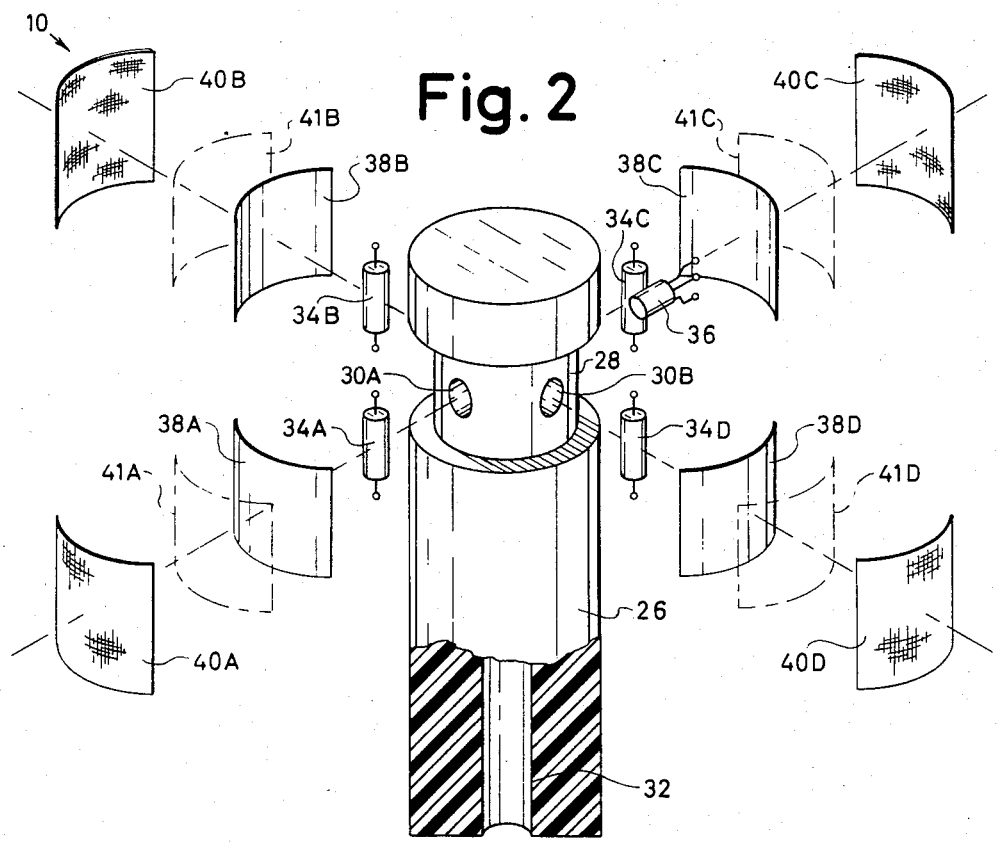
FIG. 2 is an exploded view of the components of a sensor for use with the circuit diagram of FIG. 1.

A sensor for use with a circuit of FIG. 1 (or FIG. 3) is illustrated in the exploded view of FIG. 2. This particular sensor is designed to be operated at a constant temperature. The body of the sensor is a cylindrical member 26 fabricated from a material having good thermal insulating properties, e.g. styrofoam. Near one end thereof is a ring-like recess 28 provided with four equally spaced ports (only two shown) 30A, 30B, which ports communicate with an axial passageway 32. Positioned within the recess 28, adjacent the ports, are four thermal dissipaters 34A, 34B, 34C, and 34D which are electrically connected through leads (not shown) that pass through the aforementioned ports 30 and axial passageway 32 to the aforementioned circuit. Typically these dissipators are twenty-four (24) ohm, ½ watt resistors (5%). One of the thermal dissipaters, e.g. 34C, in this drawing is provided with a temperature sensor 36. This temperature sensor may be, for example, any high beta npn transitor. Connections to this temperature sensor 36 are also provided through the aforementioned ports 30 and axial passage 32.

Immediately enclosing the thermal dissipaters 34 is a thermal moderator 38. In this figure, the moderator 38 is shown as being divided into four sections 38A, 38B, 38C and 38D. However, typically the moderator is continuous about the sensor 10 and is formed by wrapping fine copper wire or the like around the sensor body 26, and impregnating the resultant winding with material which provides good thermal conductivity to the exterior of the moderator section. This impregnating material typically is zinc oxide mixed in a silicone grease. The dimensions and construction are chosen such that the moderator section is contained within the recess 28 with the exterior surface thereof proximate the outer circumference of the central body 26. Positioned about the moderator 38 is a shroud 40 shown in this figure as four sections 40A, 40B, 40C and 40D. In practice, however, the shroud may be a continuous member about the sensor 10. The dimensions preferably are such that the shroud 40 extends above and below the moderator 38 to completely encompass the same. Shown in this figure with phantom lines is a protective layer 41 placed between the moderator 38 and the shroud 40 to protect the shroud from the aforementioned zinc oxide/silicone grease that is contained in the moderator 38. This procctection is afforded, for example, by a thin Mylar film typically 0.001 inches thick.

The shroud 40 must be similar in response to atmospheric conditions corresponding to the response of clothing worn by humans. It must not be so tightly woven as to prevent penetration of wind and the subsequent cooling effect of the skin provided thereby. Further, it must respond with a decrease in insulating properties as moisture is absorbed from the air. In addition the material should respond to both direct and indirect solar energy comparable to average clothing. One such material is knitted wool fabric using, for example, Coats & Clark ART. E.234 "Red Heart". Any high altitude, cold climate wool would be satisfactory that meets the above-identified criteria.

The construction of the sensor shown in FIG. 2, as indicated above, is for constant temperature operation. Briefly this is accomplished by passing current through the thermal dissipaters 34 to achieve a specific (selected) temperature as measured by the temperature sensor 36. It is intended to achieve a temperature similar to that of the skin of human beings which typically is in the range of 84°–88° F. As indicated by their name, the thermal dissipaters radiate heat through moderator 38 to the shroud 40 whereupon heat is dissipated in a manner similar to that experienced by a wearer of clothing. As the temperature is reduced by this dissipation, the temperature sensor 36 provides a signal indicating a reduction in temperature and further current is supplied to the thermal dissipaters 34 to reachieve the selected temperature. As will be discussed in more detail hereinafter, the amount of current or power provided to the dissipaters 34 is used as a measure of the loss of heat from the sensor 10 and thus can be converted to an analog precisely related to the chill temperature which a person would experience in the environment to which the sensor 10 is subjected.

Figure 3:
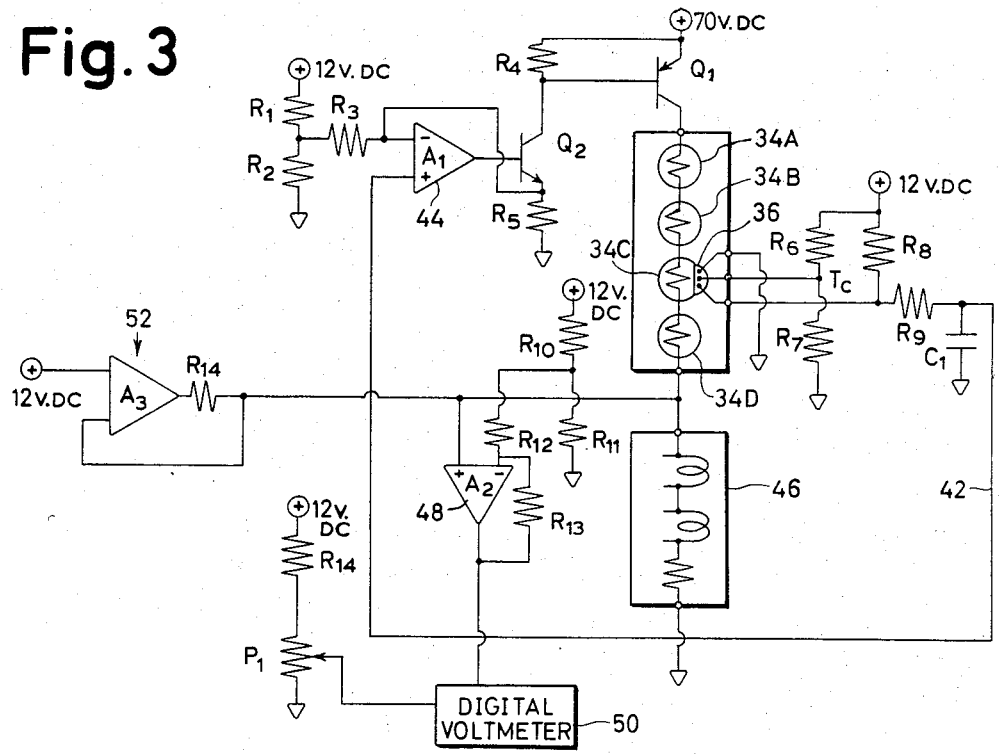
FIG. 3 is a schematic drawing of a specific circuit for use with the sensor illustrated in FIG. 2.

A schematic drawings of a circuit for use with the sensor of FIG. 2 is shown in FIG. 3. It may be seen that the four thermal dissipaters 34A, 34B, 34C and 34D are connected in series. The temperature sensor 36 connected to thermal dissipater 34C is provided with an input signal corresponding to that of the reference temperature. This input is provided by resistors $R_6$, $R_7$ and $R_8$ connected to a source of voltage. The choice of the values of resistors $R_6$ and $R_7$ establish the selected temperature reference signal. Whenever the temperature sensor 36 determines that the temperature of thermal dissipater 34C is below the referenced temperature, a signal is generated therefrom which passes through lead 42 to amplifier 44 ($A_1$). This amplifier 44 is connected to the input of transistor $Q_2$ which in turn feeds transistor $Q_1$. The combination of the amplifier and the two transistors is a conventional control circuit and its operation will be well understood by those versed in the art. Suffice to say, when the temperature sensor 36 determines that a temperature decrease from the reference point has occurred, current is fed through transistor $Q_1$ to the thermal dissipaters 34 to reestablish the temperature at the control point. Any current flowing through the thermal dissipaters, in turn, flows through a power meter 46 to ground.

The particular power meter shown comprises a pair of lamps (#45) and a resistor (three ohms). The voltage drop across the bulbs and this low resistance is equal to the square of the current flowing therethrough. This is perhaps one of the simplist circuits to accomplish the desired result. It will be recognized, however, that other devices may be used to provide a signal proportional to the current flow through the dissipaters 34.

The power meter 46, when current is flowing therethrough, produces a voltage input to amplifier 48 ($A_2$) which provides an output voltage to a digital voltmeter 50. The voltmeter is the equivalent of the readout element 24 of FIG. 1. A "zero set" signal for the digital volt meter 50 is provided from potentiometer $P_1$ and resistor $R_{14}$ connected to a standardized voltage source. It will be further understood by those versed in the art that, according to this drawing, a preconditioning signal is applied to amplifier 48 from circuit 52 ($A_3 R_{14}$) connected thereto. Not shown in this figure are the standard sources for the voltages that are required for its operation. These power sources are conventional and their operation and necessity will be fully understood by those versed in the art. In this FIG. 3, amplifiers $A_1$ and $A_2$ are typically NSC chips LM124 or LM108; $A_3$ is typically NSC chip LM317; $Q_1$ is typically a 2N4036; and $Q_2$ is typically a 2N3904.

As stipulated, the sensor described relative to FIGS. 2 and 3 is operated at a constant temperature and any heating that is required to maintain this temperature is proportional to the combined chilling effect of the environmental variables about the sensor. There are situations where it would be desirable or preferred to have a meter which provides information as to the chill temperature based upon the differential between the ambient temperature and that of the sensor.

To accomplish this, a differential temperature sensor may be provided. The construction, as described with reference to FIG. 2, is modified by replacing the four dissipaters and the thermal moderator with a heating wire element typically fabricated from copper. A constant current is passed through the winding to establish a selected differential (delta) temperature with respect to ambient temperature. A temperature sensor is utilized to record the temperature of the ambient air about the sensor. Signals representative of these two temperatures are inputed into appropriate circuitry which produces a signal equal to or less than one, which signal diminishes by the exponential value of the decrease in the delta temperature to produce the chill effect. Any deviation from a preset differential value results in a signal that corresponds to the composite effects of the environment variables. It may be seen that this permits operation of the modified sensor in higher ambient temperature regions. The change in the differential signal (C.F.) is then multiplied by the ambient temperature to produce the "chill temperature" which is appropriately displayed. As the ambient or real temperature drops, the significance of any given chill effect becomes more significant to human comfort and does so on a nonlinear curve thereby necessitating use of an exponential amplifier. When this exponential signal, which represents chill effect, is multiplied by the ambient temperature, a value for the chill factor is obtained. Accordingly, if no chill effect exists, the output of the mutiplication of the chill effect and the ambient temperature would be one; consequently the chill factor would be one. If a chill effect exists, then the chill factor would be less than one and the chill temperature less than the ambient temperature.

Figure 4:
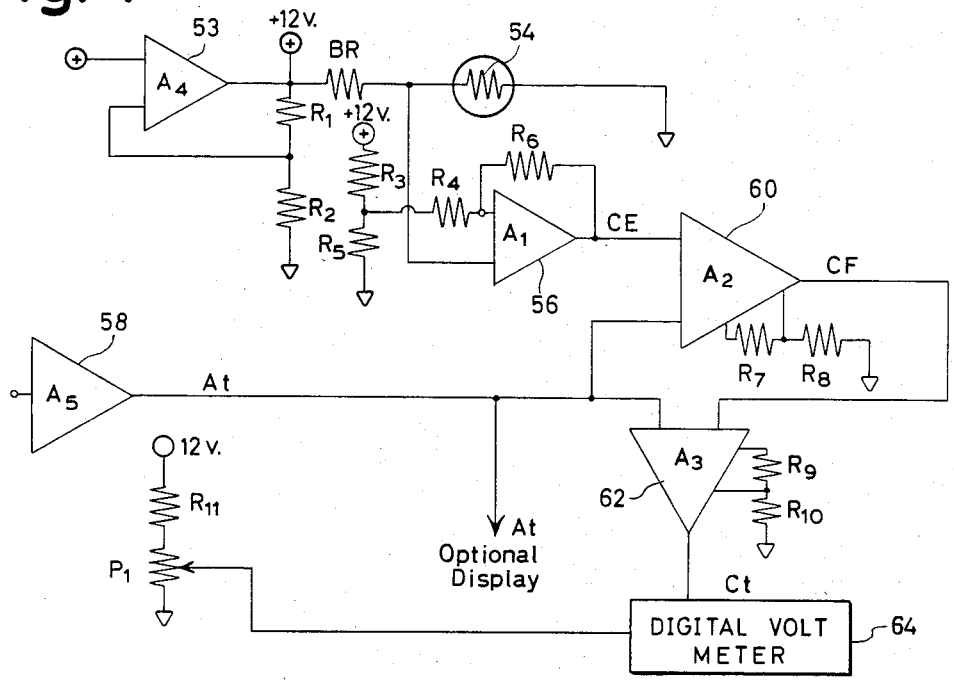
FIG. 4 is a schematic drawing of another embodiment of a circuit for use with a modified sensor having many of the components of the sensor shown in FIG. 2.

A schematic circuit diagram for use with the differential temperature sensor is illustrated in FIG. 4. In this circuit a current controller 53 ($A_4$) provides a constant voltage to the heater element 54 of the sensor which is in series with a buffer resistor BR. A corresponding voltage is also applied to one input of amplifier 56 ($A_1$) with a delta temperature reference signal being applied to the other input. A temperature sensor for ambient temperature provides an input to element 58 ($A_5$) which in turn provides an output signal which feeds one input to a multifunction amplifier 60 ($A_2$). The second input to this amplifier 60 is the output of amplifier 56. Resistors $R_7$ and $R_8$, associated with amplifier 60, provide for adjusting the calibration mutiplier factor for the unit. The output from amplifier 60, because of the treatment of the input signals, corresponds to the chill factor of the environment. This chill factor is fed to one input of a second multifunction amplifier 62 ($A_3$). Since the other input to this element is a signal proportional to the ambient temperature, the output from amplifier 62 is in the form of an analog of the chill temperature and this may be displayed on a digital voltmeter 64 or the like. It will be noted that a provision is made to display the signal proportional to the ambient temperature if such is desired. As in the case of the circuit diagram of FIG. 3, provision is made to adjust the zero set point of the digital volt meter through use of the potentiometer $P_1$ and resistor $R_{11}$.

In this FIG. 4, amplifier 53 may be, for example, NSC chip LM317. Amplifier 56 typically is NSC chip LM124 or LM108, and multifunction amplifiers 60, 62 may typically be NSC chip LH0094 or Motorola chip MC1494L. The amplifier 58 may be NSC chip LX5700. Values of other circuit components will depend upon the temperature differential to be maintained, and upon the particular semiconductor chips that are used. Their values would be known to a person of ordinary skill.

Although the above discussion with regard to both the constant temperature sensor and the differential or delta temperature sensor has inferred that all of the four principle variables for chill temperature are being monitored, it will be understood by those versed in the art that if one or more or the environmential factors is maintained constant, the sensors will then provide an output that is proportional to the effect of the conditions that remain variable. For example, if the sensor is maintained in an environment of constant humidity, and temperature and solar radiation but the wind velocity is variable, the output will be solely a function of the wind velocity. Similarly the sensor may be used to determine specifically the humidity by maintaining the other factors constant. Such use may be highly desirable in scientific studies of various types. Under laboratory controlled conditions, for example, the individual contribution of wind velocity, humidity, solar effects and temperature upon the comfort of an individual may be studied as well as their combined effects on human comfort.

Environment factors affect the comfort of a person in both winter and summer. In winter the comfort (discomfort) is called winter chill; in summer, it is called summer chill. In summer a thermometer indicates the worst possible condition, and solar, wind velocity and humidity effects often improve the comfort of a person.

Figure 5:
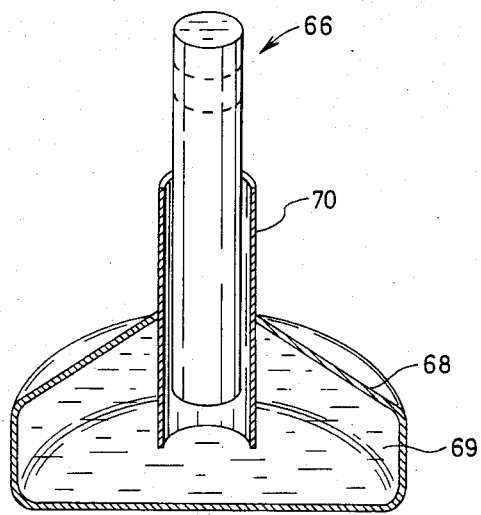
FIG. 5 is a sketch of a sensor for use in determining summer chill.
Figure 6:
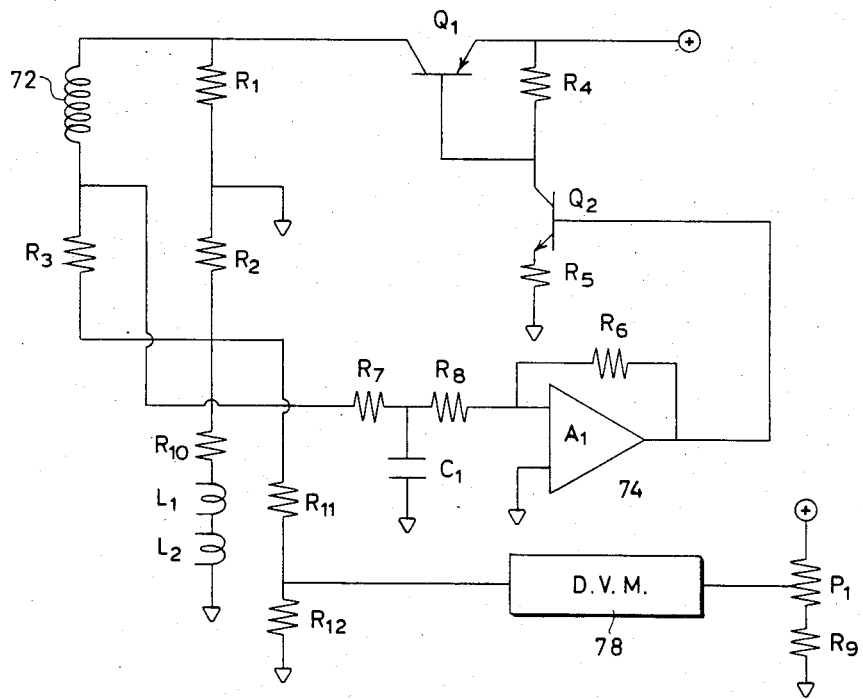
FIG. 6 is a schematic drawing of a circuit for use with the sensor of FIG. 5.

A sensor and circuit for determining summer chill are shown in FIGS. 5 and 6. Referring to FIG. 5, the sensor is shown at 66. It is similar in physical construction to the structures previously described. A cylindrical heater element is mounted on a thermal support. This heater, typically formed from copper wire, is designed to be controlled at a constant temperature, e.g. 110° F. The heater is interlayered between a pair of wicks which extend down into a vessel 68 containing water 69 and is supported therein by sleeve 70. This construction maintains the heater element in a moisture-saturated environment in order to sense the evaporation effect of sun and wind on the sensor.

A circuit for use with the sensor of FIG. 5 is illustrated in FIG. 6. The heater element 72 is in a bridge circuit comprising resistors $R_1$, $R_2$ and $R_3$. When the heater temperature varies from its intended value (e.g., 110° F.), a signal to amplifier ($A_1$) 74 regulates the current to the heater by action of the transistors $Q_1$ and $Q_2$ thereby reestablishing the selected temperature. Current through the heater 72 flows through a power meter 76 of the type described with respect to FIG. 3. This power meter provides an input to a digital voltmeter 78 for a readout of the summer chill.

From the foregoing description it will be recognized that a highly usable meter is provided for use in determining combined factors associated with the comfort of an individual in his or her environment. The instrument takes into effect wind velocity, temperature, humidity and/or solar effects and provides a an output which is relatable to the chill temperature that the human body would experience in that environment. The meter may be fabricated in a compact manner for easy portability as well as in a more complex structure for permanent installation. It will be highly useful in various phases of meteorology and weather forecasting. Controlled testing of the meter will provide for sufficiently accurate calibration such that it will be useful for individuals as well as for scientific study.

It is of course understood that although preferred embodiments of the present have been illustrated and described, various modifications thereof will become apparent to those versed in the art. Accordingly, the scope of the invention should be defined only by the appended claims and the equivalence thereof.

We claim:

1. A non-directional sensor for determining the effect of prevailing composite environmental factors of wind velocity, real temperature, humidity and solar effects upon a human in the form of chill temperature, or chill factor, which comprises:
   a central elongated core fabricated of a thermal insulating material;
   a heat-producing element supported by and symmetrically surrounding said core to establish a selected temperature at the surface of said heat-producing element;
   a fabric shroud covering said heat-producing element, said shroud having characteristics with regard to wind penetration, moisture absorption and solar radiation or reaction corresponding to characteristics of normal clothing worn by said human for said prevailing real temperature; and
   circuit means electrically connected to said heat-producing element which includes means for supplying electrical power to said heat-producing element to produce and maintain said selected temperature at said surface of said heat-producing element, and means for determining the value of said electrical power as a measure of said chill temperature or chill factor.

2. The sensor of claim 1 further comprising a thermal moderator interposed between, and in substantial contact with, said heat-producing element and said shroud to uniformly distribute said selected temperature around said heat-producing element.

3. The sensor of claim 1 further comprising a first temperature sensing element positioned adjacent said heat-producing element and responsive to the actual temperature of said heat producing element, to produce a first electrical signal proportional to said actual temperature; and means for electrically connecting said first temperature sensing element to said control means in said circuit for supplying said electrical power to said heat-producing element to achieve said selected temperature.

4. The sensor of claim 1 further comprising a second temperature sensing element responsive to ambient temperature about said sensor, removed from said heat-producing element, to produce a further electrical signal proportional to said ambient temperature; and means for connecting said second temperature sensing element to said circuit further, said circuit including means for regulating a selected differential between said selected temperature of said heat producing element and said ambient temperature.

5. The sensor of claim 1 wherein said heat-producing element comprises:
   a plurality of thermal dissipaters electrically connected in series equally spaced about said core, said core being provided with an annular exterior recess to receive said dissipaters;
   a thermal moderator surrounding said core at said recess and enclosing said thermal dissipaters, said thermal moderator uniformly distributing the heat of said thermal dissipaters to achieve a uniform distribution of said selected temperature around said core within said shroud.

6. The sensor of claim 5 wherein said thermal moderator comprises a winding of metallic wire about said thermal dissipaters, a zinc oxide-silicone grease composition filling the interstices between adjacent winding of said wire, and a plastic covering about said winding to prevent contact of said zinc oxide-silicone greese with said shroud, said shroud fabricated of a woven wool fabric.

7. The sensor of claim 3 wherein said heat producing elements includes a plurality of discrete heat-producing units and said first temperature sensing element is attached to one of said heat producing units.

8. The sensor of claim 3 further comprising an electrical circuit attached to said control means for determining the power supplied to said heat-producing element, said power requirement being related to said composite environmental factors, and means connected to said circuit to display an analog signal of said power as said chill effect or chill temperature.

9. The sensor of claim 4 further comprising circuit means connected between said control means for supplying electrical power to said heat producing element and said means connected to said sensing element responsive to said ambient temperature, for multiplying otput signals thereof to achieve a further signal proportional to the chill temperature and means for converting said further signal corresponding to said chill temperature to visible readout.

10. A non-directional instrument for determining the effect of the prevailing composite environmental factors of wind velocity, real temperature, humidity and solar effects upon a human in the form of chill temperature, or a chill factor, which comprises:

an elongated cylindrical core fabricated of a thermal insulating material;

a heat-producing element supported by and symmetrically surrounding said core to establish a selected temperature of said heat-producing element;

a fabric shroud covering said heat-producing element, said shroud characterized by wind penetration, moisture absorption and solar effects corresponding to characteristics of normal clothing worn by said human for said prevailing real temperature;

circuit means connected to said heat producing element for supplying power to said heat producing element to produce said selected temperature;

means for determining and producing a first signal proportional to said selected temperature at said heat-producing element connected to said circuit means; and means for determining said power supplied to said heat-producing element to maintain said selected temperature, said power being a measure of said chill temperature or chill factor.

11. The instrument of claim 10 wherein said core is provided with an annular external recess, and said heat producing element is a heater wire spirally wound around said core within said recess.

12. A non-directional instrument for determining the effect of the prevailing composite environmental factors of wind velocity, real temperature, humidity and solar effects upon a human in the form of chill temperature, or chill factor, which comprises:

an elongated cylindrical core fabricated of a thermal insulating material;

a heat-producing element supported by and symmetrically surrounding said core to establish a temperature of said heat-producing element;

a fabric shroud covering said heat-producing element, said shroud characterized by wind penetration, moisture absorption and solar effects corresponding to characteristics of normal clothing worn by said human for said prevailing real temperature;

first means for determining and producing a first electrical signal proportional to said temperature of said heat-producing element;

further means for determining and producing a further electrical signal proportional to ambient temperature;

circuit means including a power source connected to said heat-producing element for supplying power to establish said temperature of said heat-producing element, said circuit means also including circuitry for determining a differential between said first and further electrical signals and for regulating said power source to maintain a constant differential; and means for measuring power delivered by said power source as a measure of said chill temperature or chill factor.

13. The sensor of claim 1 wherein said shroud is fabricated of fabric characterized by exhibiting a reduced thermal insulating value as said humidity increases.

14. The instrument of claims 10 or 12 wherein said shroud is fabricated of a fabric characterized by exhibiting a reduced thermal insulating value as said humidity increases.

15. The instrument of claims 10 or 12 wherein said means for determining said power supplied to said heat-producing element is a power meter comprising a resistive element of known resistance serially connected between said power source and said heat-producing element, and means for measuring a voltage generated across said resistive element as a function of the square of current flowing from said power source through said resistive element and said heat-producing element.

* * * * *